March 26, 1968   L. J. SMITH, JR   3,374,558
EDUCATIONAL PEG BOARD
Filed Feb. 16, 1966

INVENTOR.
LUKE J. SMITH, JR.
BY Kenwood Ross
ATTORNEY.

United States Patent Office

3,374,558
Patented Mar. 26, 1968

3,374,558
EDUCATIONAL PEG BOARD
Luke J. Smith, Jr., East Longmeadow, Mass., assignor to Milton Bradley Company, Springfield, Mass., a corporation of Massachusetts
Filed Feb. 16, 1966, Ser. No. 527,794
1 Claim. (Cl. 35—31)

ABSTRACT OF THE DISCLOSURE

A teaching device comprising a peg board having openings therein, a plurality of opaque overlay cards, each card having sets of openings therein alignable with certain of the openings in the peg board when one of the overlay cards is superposed on the peg board, and a plurality of pegs insertible in the openings in the overlay card and peg board, the sets of openings in the overlay cards being of odd and even number, and the peg board being in the form of an enclosed container having a base wall provided with a plurality of spaced parallel, arcuate grooves separated by upstanding ribs, the grooves being complemental to the pegs for storage of the pegs in an orderly manner when not in use.

---

My invention relates to a new and improved educational device for teaching arithmetic.

A primary object of the invention is to provide a teaching device which will aid the pupil in discovering number patterns thereby setting up a summarizing set of experiences.

By means of the educational device hereof, pupils now are able to study the odd numbers and even numbers in their several relationships, to sense the difference in the patterns, and to gain further knowledge of the important set of numbers through 10.

Figure 1:
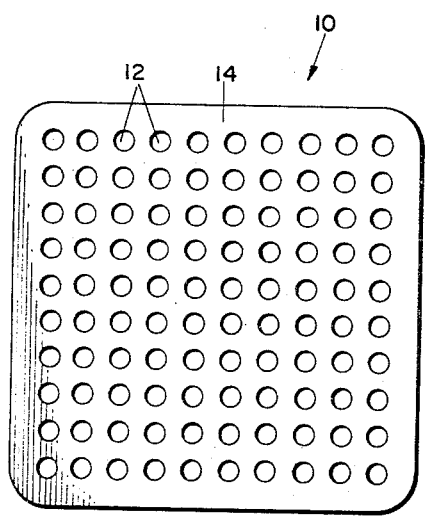
FIG. 1 is a top plan view of a peg board of the type employed in practicing the invention.
Figure 2:
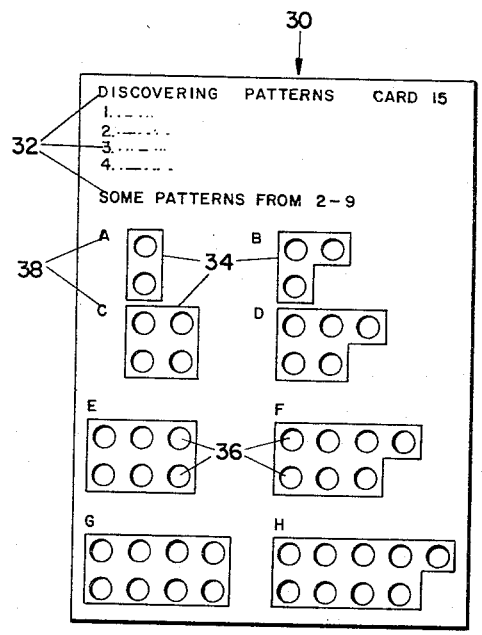
FIG. 2 is a top plan view of an apertured overlay card used with the peg board of FIG. 1.
Figure 3:
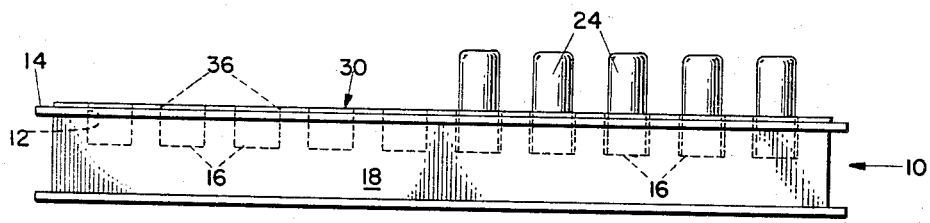
Figure 4:
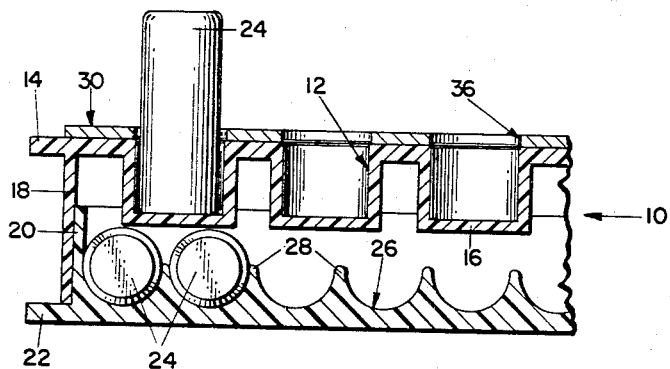

FIG. 3 is an end elevational view of the overlay card of FIG. 2 superposed on the peg board of FIG. 1, and with pegs passing through the aligned openings in the overlay card and peg board; and FIG. 4 is an enlarged fragmentary and cross sectional view through a superposed overlay card and peg board embodying the invention, with a peg in situ in the openings of the overlay card and peg board and with additional pegs being stored within the peg board.

With reference now to the drawing, I have shown a peg board generally indicated by 10 of substantially square configuration in plan having a plurality of spaced parallel horizontally and vertically aligned circular openings 12 provided in a top wall 14 thereof. Since the device is designed primarily for teaching important sets of numbers through ten, there are preferably but not necessarily ten openings 12 in each of ten horizontal and vertical rows of such openings.

For ease in economy of manufacture the peg board is preferably molded from a durable plastic material, with the top wall being provided with depending pockets 16 open at their tops to define the aforementioned openings 12.

The top wall is additionally provided with a depending perimetral wall 18 adapted to sleeve in telescoping manner a complementary upright wall 20 provided on a base wall 22, thereby to form an enclosed container for a plurality of cylindrical pegs or pins 24 used in practicing the invention, as will appear.

The innermost planar face of base wall 22 is provided with a plurality of spaced parallel arcuate grooves 26 separated by upstanding ribs 28, the grooves being complemental to the pegs or pins 24 whereby said pegs or pins can be readily stored in an orderly manner within the peg board, each groove carrying a plurality thereof in end to end alignment.

A plurality of generally rectangular overlay cards are provided for use in conjunction with peg board 10. One of these overlay cards is shown in FIG. 2 and is generally indicated by 30. Card 30 which is formed from an opaque material such as paper board, carries instructional and other indicia 32 thereon and is provided with a plurality of groups or sets 34 of spaced parallel horizontally and vertically aligned circular openings 36 therein, each group or set 34 being identified as by a letter 38, and said openings being of substantially the same diameter as openings 12 in top wall 14 of the peg board and having the same spacing therebetween as said openings 12.

The pegs or pins 24, which may be brightly colored to stimulate student interest, are adapted for easy and loose insertion in the openings 36 of the overlay card and the openings 12 of top wall 14 of the peg board and rest within the depending pockets 16 of the peg board when the overlay card is superposed upon said top wall of the peg board.

The sets or groups of openings 34 in the overlay cards define various number combinations, some odd and some even. The student, by placing pegs in the openings in the overlay obtains a graphic picture of the patterns which numbers assume.

For instance in the group A on the overlay, he sees that there are an even number of pegs, while in the group B there are an odd number of pegs.

Since the overlay cards are opaque, the student is not distracted or confused by the plurality of openings in the top wall of the peg board, wherefore he is able to concentrate his attention solely on the number patterns disclosed by the particular overlay card being employed.

As many overlay cards as desired may be used and each may have various combinations of odd and even numbered sets to provide an invaluable teaching aid.

I claim:

1. A teaching device comprising a peg board having openings therein, a plurality of opaque overlay cards, each card having sets of openings therein alignable with certain of the openings in the peg board when one of the overlay cards is superposed on the peg board, and a plurality of pegs insertible in the openings in the overlay card and peg board, the sets of openings in the overlay cards being of odd and even number, and the peg board being in the form of an enclosed container having a base wall provided with a plurality of spaced parallel arcuate grooves separated by upstanding ribs, the grooves being complemental to the pegs for storage of the pegs in an orderly manner when not in use.

References Cited

UNITED STATES PATENTS

| 2,066,818 | 1/1937 | Beall | 35—48.1 |
| 2,892,267 | 6/1959 | Harvey | 35—31.4 |
| 2,971,275 | 2/1961 | Provenzano | 35—31.4 |
| 3,149,842 | 9/1964 | Cirrincione | 273—130 |

EUGENE R. CAPOZIO, *Primary Examiner.*

W. H. GRIEB, *Examiner.*